(12) United States Patent
Westh

(10) Patent No.: US 6,722,885 B2
(45) Date of Patent: Apr. 20, 2004

(54) PICTURE BASED PSYCHOLOGICAL TEST

(75) Inventor: Finn Westh, Copenhagen (DK)

(73) Assignee: Westh Development ApS, Copenhagen (DK)

( * ) Notice: Subject to any disclaimer, the term of this patent is extended or adjusted under 35 U.S.C. 154(b) by 0 days.

(21) Appl. No.: 09/984,026

(22) Filed: Oct. 26, 2001

(65) Prior Publication Data

US 2002/0076678 A1 Jun. 20, 2002

Related U.S. Application Data

(60) Provisional application No. 60/256,461, filed on Dec. 20, 2000.

(51) Int. Cl.⁷ .............................. G09B 19/00
(52) U.S. Cl. ...................................... 434/236
(58) Field of Search ................ 434/236, 237, 434/238, 219, 107, 235

(56) References Cited

U.S. PATENT DOCUMENTS

| | | | | |
|---|---|---|---|---|
| 4,637,799 A | * | 1/1987 | Bouchal | 434/236 |
| 5,813,863 A | * | 9/1998 | Sloane et al. | 434/236 |
| 6,030,226 A | * | 2/2000 | Hersh | 434/236 |
| 6,527,700 B1 | * | 3/2003 | Manico et al. | 600/26 |

FOREIGN PATENT DOCUMENTS

| | | |
|---|---|---|
| GB | 2 242 557 A | 10/1991 |
| GB | 2 335 856 A | 10/1999 |
| WO | WO 97/36273 | 10/1997 |
| WO | WO 99/48074 | 9/1999 |

OTHER PUBLICATIONS

Eysenck, H. J. (1962). Know Your Own I.Q.. Bell Publishing Company, pp. 39, 54, 190–192.*
Grandin, T. (Oct., 1998), Consciousness in Animals and People with Autism. Department of Animal Science. Colorado State University.*
Bloom, P. (2001).Precis of How Children Learn the Meanings of Words. Behavioral and Brain Sciences, 24, 1100.*

* cited by examiner

Primary Examiner—John Edmund Rovnak
(74) Attorney, Agent, or Firm—Volentine Francos, PLLC

(57) ABSTRACT

A picture based psychological test, in particular a computer based implementation of the test and a system for automation of at least part of the test. The test may be used for the purpose of identifying a person's preferred way of interacting with other people. For example the test may be used to obtain knowledge of and describe relations within a family, a working team, a sports team, a study class, a political party, a religious community, etc, quickly, directly, and objectively. The test is non-verbal so that it is independent of the language used by the person whose relations and interactions are investigated.

29 Claims, 24 Drawing Sheets

PICTURE BASED PSYCHOLOGICAL TEST

This application claims benefit of application Ser. No. 60/256,461 filed Dec. 20, 2000.

FIELD OF THE INVENTION

The present invention relates to a picture based psychological test, in particular a computer based implementation of the test and a system for automation of at least part of the test.

BACKGROUND OF THE INVENTION

It is well known to apply various psychological test instruments when it is desired to determine a person's resources, behaviour, etc, such as:

- A questionnaire, i.e. a multidimensional multiple choice language based test instrument forcing the person under test to select among different statements or to answer yes or no to a number of statements,
- A multiple choice picture based test instrument forcing the person under test to select between a certain number of pictures (e.g. like or dislike),
- An open picture based projective test instruments, e.g. Rorschach's inkblot test, asking the test person to describe what the person under test perceives. Later, this is categorised in relation to two or more predefined psychological characteristics,
- Showing live or on video the interaction between people and rating non-structured and semi-structured observations of the interaction, e.g. observing interactions between a mother and her child using the rating of Strange Situations.

Each of these known test instruments applies a range of well known psychological characteristics relating to their respective field of use, e.g. human resource, psychiatry, social counselling, etc.

It is a disadvantage of the language based questionnaires that, typically, they are rather difficult to understand leaving an uncertainty concerning the tested person's interpretation of the questions. Further, they may be very long and comprehensive due to a desire of covering many aspects demotivating the person under test.

It is a disadvantage of the multiple choice picture based test instruments that they focus on static situations, typically the faces of a person, a group of colors, etc, without elements of interaction.

The open picture based projective test instruments have ambiguity relating to the interpretations of the answers of the person under test leading to ambiguity in the later categorisation of the answers.

Rating of observations has ambiguity relating to the interpretation of the person under test of the ongoing interaction in the observed situation.

SUMMARY OF THE INVENTION

Thus, there is a need for a psychological test that is non-verbal, picture based, easy and quick to perform, that motivates the person under test, and that fulfills the scientific requirements of a psychological test.

According to the present invention the above and other objects are fulfilled by a dynamic picture based multiple choice test. The test may be used for the purpose of identifying a person's preferred way of interacting with other people. For example the test may be used to obtain knowledge of and describe relations within a family, a working team, a sports team, a study class, a political party, a religious community, etc.

It is an important advantage of the picture based test that it provides knowledge of human relations and interactions quickly, directly, and objectively.

It is another important advantage of the picture based test that it is non-verbal so that it is independent of the language used by the person whose relations and interactions are investigated with the invention. Further, it is easier for a person to relate to a picture than to a verbal statement.

Preferably, the pictures are culturally neutral so that they may be used all over the world.

A person whose preferred way of interacting with other people it is desired to determine is also called the test object, and a person who is undergoing the test is called the person under test or the test person. The test objects preferred way of interacting with others may be determined based on test results from the test object itself in combination with test results from other relevant persons. Thus, the person under test may be the test object or may be another person that has interacted with the test object.

In one embodiment of the invention, the four most important psychological characteristics of interactions and relations within a family have been identified, and the test provides information of the extent to which a person acts according to one of these characteristics.

During the test, the person under test is presented with a first picture of a first situation. Thereafter, the person under test is presented with a set of second pictures of respective second situations, e.g. four pictures of different second situations. The first situation and each of the second situations form a respective sequence of situations wherein the respective second situations may precede or succeed the situation depicted on the first picture. Then the person under test is asked to select the second picture that he perceives to have the most obvious relation to the first situation. For example, when the second situations succede the first situation, the test person selects the second situation that he perceives to be the most likely to occur after the first situation. The selection performed by the person under test may provide information on that person's preferred way of interacting with other people, or, it may provide information on that person's perception of another person's preferred way of interacting with other persons For example, information on a parents preferred way of interacting with the person's at least one child, or, a childs perception of one of the child's parent's way of interacting with the child may be provided.

In another example, information on a leader's preferred way of interacting with the leader's at least one subordinate, or, a subordinate's perceptions of the leader's way of interacting with the subordinate may be provided. Likewise for a teacher and the teacher's pupils.

The selections performed by the tested person may be input to a computer for processing of the selection for provision of an output charaterising the test object.

During the test, the person under test is presented with a plurality of first pictures and corresponding sets of second pictures.

In an embodiment for studying relations and interactions within a family, it is presently preferred to present the person under test with 24 first pictures and corresponding 24 sets consisting of four second pictures. The pictures depict a family in various situations. A parent under test is asked to select a second picture depicting the situation that the parent perceives most likely to precede or succeed the first situation in question. The parent's selection provides information on how the parent prefers to act in specific situations. Likewise, a child under test is asked to select a second picture depicting the situation that the child expects to succeed or precede the first situation in question thereby providing information on how the child perceives the interactions of the parents.

The first and second pictures may be adapted for use with persons of different age, i.e. a given set of first and second pictures may be used for testing a parent while a different set of first and second pictures may be used for testing a child between 3 and 7 years old while a still different set of first and second pictures may be used for testing a child between 8 and 15 years old.

According to the invention, interactions within a specific group of people, such as a family, a team, a study class, a political party, a religious community, etc. are described by a specific number of specific psychological characteristics. During the test, information is provided on the extent to which a person's interaction has the specific psychological characteristics.

The psychological characteristics have the same level of abstraction, they do not compete with each other in the description of human behaviour, they describe sustained human behaviour and they can be visualised.

For example, the psychological characteristics used to describe interactions within a family are focus, empathy, flexibility, and energy.

Focus indicates whether the parent focuses on the parent's own person or whether the parent focuses on the child. Empathy indicates whether the parent is primarily emotional or intellectual in the interaction with the child. Flexibility indicates whether the parent makes decisions on the basis of the actual situation, or whether the parent prefers to act according to existing rules and principles. Energy indicates the level of activity or passivity in the parent's interaction with the child.

It is preferred to select one psychological characteristic as a reference and relate the other psychological characteristics to the selected reference. For example, energy may be selected as a reference for focus, empathy, and flexibility, respectively. Thus, the person's energy in relation to different aspects may be determined, typically the energy is quantified in two levels: high and low, however more than two levels may be used if appropriate.

Energy may be plotted along a y-axis in a system of co-ordinates, and each of the other characteristics along an x-axis, thereby creating three respective co-ordinate systems for characterisation of a person's interaction in a family. Each of the first pictures may relate to a specific co-ordinate system, i.e. to a specific psychological parameter in relation to energy and a plurality of first pictures may relate to the same co-ordinate system for improvement of the statistical significance of the responses of the person under test. For example, three sets of eight first pictures may be shown to the person under test wherein each set of eight pictures relates to the same respective co-ordinate system. Further, each of the four second pictures in a set of second pictures may relate to a specific quadrant of the respective co-ordinate system. This is further described below. A test with 24 first pictures may be performed in less than an hour.

Having completed a test, the selections performed by the person under test may be transmitted to a computer for processing. The test results may also be stored in a database. The database may also hold results from other tests, and the database may hold other data relating to the persons under test. The computer may combine the data stored in the database to provide or support an evaluation of a given person. Further, the computer may search for and select a person with data in the database. The computer may provide a general description of the resources of a person and may provide a description of possibilities for development of the person. Further, the computer may suggest one or more supervisory strategies for selection by a psychologist, e.g. to be undertaken in a treatment or counselling program.

A psychological profile is a compilation of a person's preferred way of interacting with other people under certain circumstances, e.g. as parent, leader, priest, coach, teacher, etc, described in terms of the psychological characteristics used. Each set of pictures relates to a combination of psychological characteristics, one of which may be, for example, energy. The selections of the person under test are compiled into a psychological profile of the person whose preferred way of interacting with other people, it is desired to determine. In the profile, all the characteristics used in the test are related to each other.

The means for performing the test may comprise a ring binder holding the first and second pictures, a manual, and a scoring scheme to record the selections of the person under test. The selections recorded in the scoring scheme may be transferred to a computer that processes the recordings to provide a test result, e.g. a psychological profile, a general description of the resources of a person, development possibilities of the person, etc, as previously described. Further, the selections may be recorded on a home page on the Internet and the recordings may be transferred using the Internet to a computer for processing and to a database for storage.

In an embodiment of the invention, 120 pictures are provided grouped into 24 items each of which consists of one first picture introducing a specific situation and four second pictures one of which is to be selected by the person under test as the one of the four second pictures that has the most obvious relationship with the respective first picture as previously described. The five pictures of an item may be positioned on a single sheet that is inserted into the ring binder so that the person under test may look at all five pictures simultaneously. Each item relates to a specific combination of two psychological characteristics, such as focus and energy, empathy and energy, or flexibility and energy and in the previously described co-ordinate systems, each of the second pictures of an item relates to a specific quadrant in the co-ordinate system. The items are ordered randomly in the ring binder.

As already mentioned, one embodiment of the invention is adapted to be used for determining human interaction within a family having at least one adult with the responsibility to bring up at least one child. The test may be used in situations where a quick and valid determination of the preferred way of performing as a parent is required, for example if a family crisis is under development.

The test may be utilised by professionals, such as psychologists, psychiatrists, adoption authorities, legal authorities, etc, in family therapy and family counselling or other social counselling.

BRIEF DESCRIPTION OF THE DRAWINGS

In the following, a preferred embodiment of the invention will be described with reference to the drawing, wherein.

DESCRIPTION OF PREFERRED EMBODIMENTS

Figure 1:
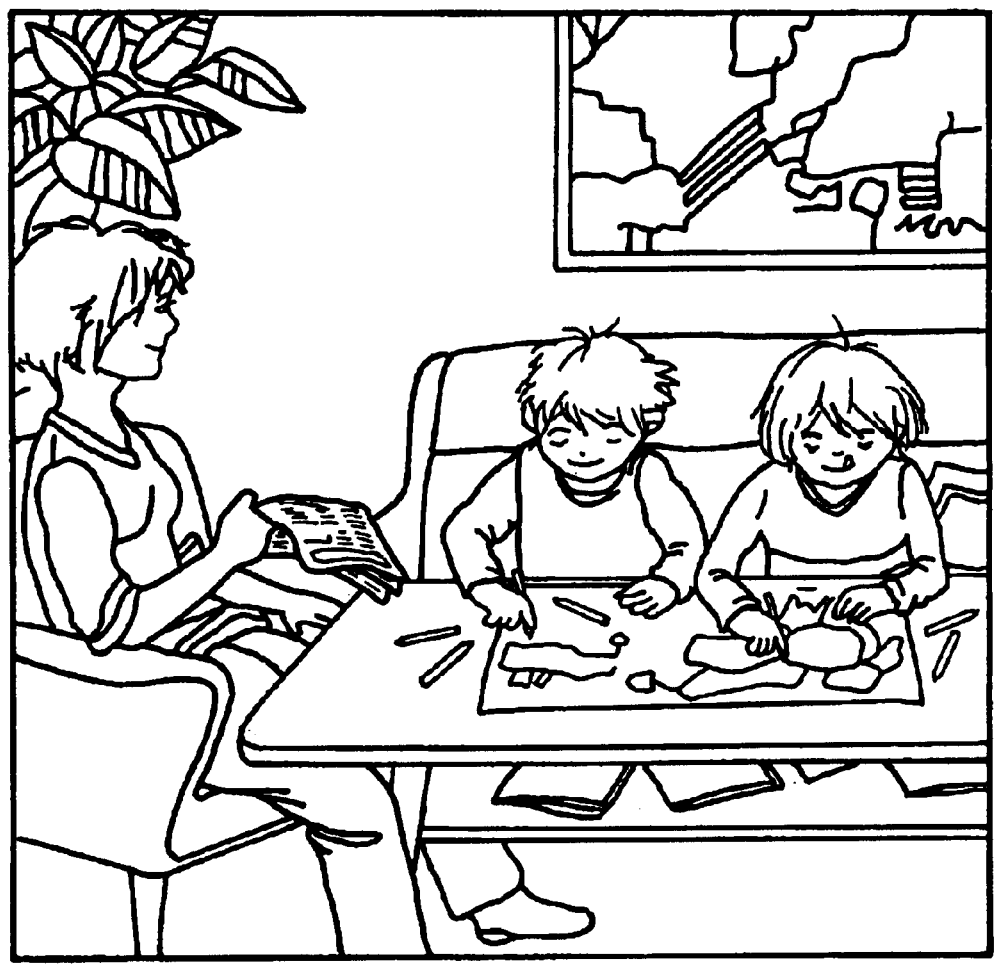
FIG. 1 shows a first picture relating to a parent's focus toward a child.

The present invention will now be described in detail with reference to a few preferred embodiments thereof as illustrated in the accompanying drawings. In the following description, numerous specific details are set forth in order to provide a thorough understanding of the present invention. It will be apparent however, to one skilled in the art, that the present invention may be practiced without some or all of the specific details. Below a preferred embodiment of the present invention relating to interactions within a family is disclosed. However, the disclosed advantageous features of the invention apply equally well to embodiments relating to interactions within other groups, such as a working team, a sports team, a study class, a political party, a religious community, etc, as previously described.

The present embodiment comprises two structural elements: The Picture Based Multiple-choice System (PBMS), i.e. the previously described set of pictures illustrating various typical situations experienced by a family, and the Dynamic Quadrant (DQ), i.e. the previously described co-ordinate system depicting two psychological characteristics along its respective axis.

Other embodiments may contain a PBMS with other pictures and other DQs relating to psychological characteristics appropriate for the use of that embodiment.

In accordance with the present invention, a Parents Preference Test (PPT) has been provided for determination of a parents' preferred way of interacting with the parent's children. The output of the test is a so-called parent profile, which can be used as a basis for therapy, for the counselling of families, in custody cases or in adoption processes.

The PPT is a multiple-choice test based on a plurality of pictures (PBMS). Thus, the person under test, i.e the parent or a child of the parent, is not required to read or to speak, i.e. the test is made independent of the person's linguistic abilities.

The pictures in the PPT depict typical situations from everyday life in a family. It is an object of the PPT to determine psychological characteristics of the parents preferred way of interacting with the child. The pictures are preferably culturally neutral so that the test can be used all over the world. If preferred, the pictures may be adapted to different cultures e.g. showing individuals dressed in a way that is typical for the culture in question. Since the test is picture-based, there is no language barrier.

Completing and scoring the test takes a professional test psychologist approximately one hour.

The instruction of the person under test is quite simple. The person is told that he or she will be shown a picture representing an everyday family situation. Then the picture is shown to the person. Afterwards the person is shown four second pictures, each of which may precede or succeed, respectively, the situation depicted on the first picture. The person under test is asked to select that picture out of the four pictures that the person perceives to be the most likely to occur after or before, respectively, the situation of the first picture. Then, the person is introduced to the next situation and so on. The PPT has 24 first pictures illustrating 24 different situations.

The first and second pictures may be displayed to the person under test on a computer screen. Further, the instructions for the person under test may also be provided on the computer screen. The person under test may command the computer to show the next picture on the screen, e.g. by pressing a key on the computer keyboard, or clicking the mouse. The person under test may input the selection of a second picture to the computer, e.g. using the computer mouse and cursor to move the cursor to the picture to be selected and clicking the mouse. The computer with the computer screen may be connected to a computer network, such as the Internet, and the pictures may be transferred to the computer with the computer screen via the network. Further, the selections may be transferred via the network to another computer, e.g. of the person conducting the test, e.g. a psychologist, a psychiatrist, etc, for further processing and optional storage, e.g. in a database.

As already mentioned, the selections made by the person under test is entered into a computer after completion of the test. The selections are processed by the computer for provision of a general description of the parent whose preferred way of interacting with a child it is desired to determine. Preferably the description and other results are generated based on the selections made by the parent in question in combination with selections made by one or more of the parent's children. Further, results from other tests of the parent in question or one or more of the parent's children may be included in the generation of the result. The description includes a mentioning of the resources and possibilities of development of the parent in question. This general description is called a parental profile. The computer may also generate various suggestions for supervisory strategies that the psychologist may undertake in a treatment or counselling program, e.g. of the parent, one or more children of the parent, the family that includes the parent, etc.

The behavioural aspects and psychological characteristics determined utilising the Parents Preference Test relate to the quality of the parent's attention to a child and the level of energy of the attention. The psychological characteristics are:

Focus: the test shows whether the parent is primarily focusing on his or her own person, or whether the parent is primarily focusing on the child.

Empathy: the test shows whether the parent is primarily emotional or intellectual.

Flexibility: the test shows whether the parent makes decisions on the basis of the actual situation, or whether the parent prefers to act according to an existing set of rules and principles.

Energy: the test indicates the level of activity or passivity in the parent's attitude.

Three Dynamic Quadrants, each of which maps empathy, focus or flexibility, respectively, along its x-axis, and energy along its y-axis, are included in the parental profile.

FIGS. 1–15 are a set of pictures included in a PPT that may be used after a divorce for determination of which one of the parents that should have custody of their one or more children.

Figure 2:
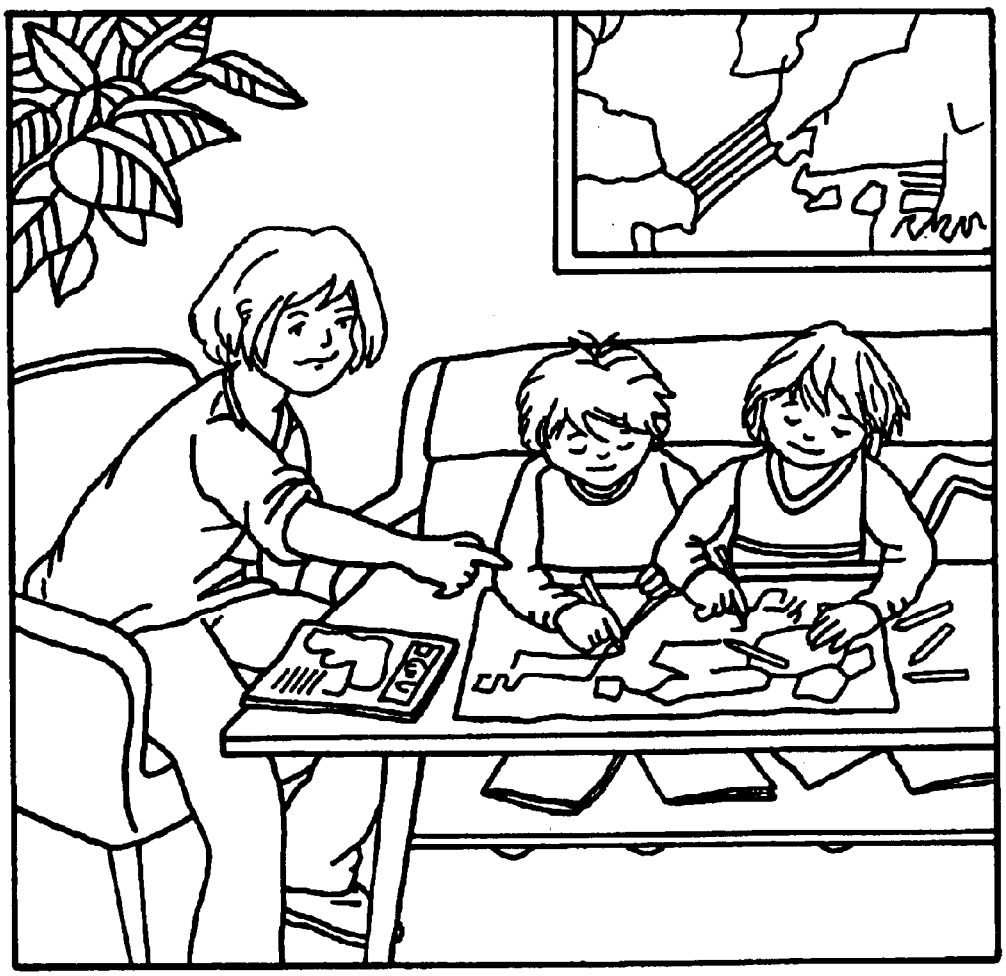
FIGS. 2–5 show a set of second pictures relating to the first picture of FIG. 1.

FIG. 1 is a first picture—the presentation picture—which illustrates a mother sitting in a chair reading and watching her children sitting in a sofa making drawings. FIGS. 2–5 illustrate different other situations with the family:

In FIG. 2, the mother has her focus on her childrens' activity and is actively making comments or suggestions in relation to the drawings.

Figure 3:
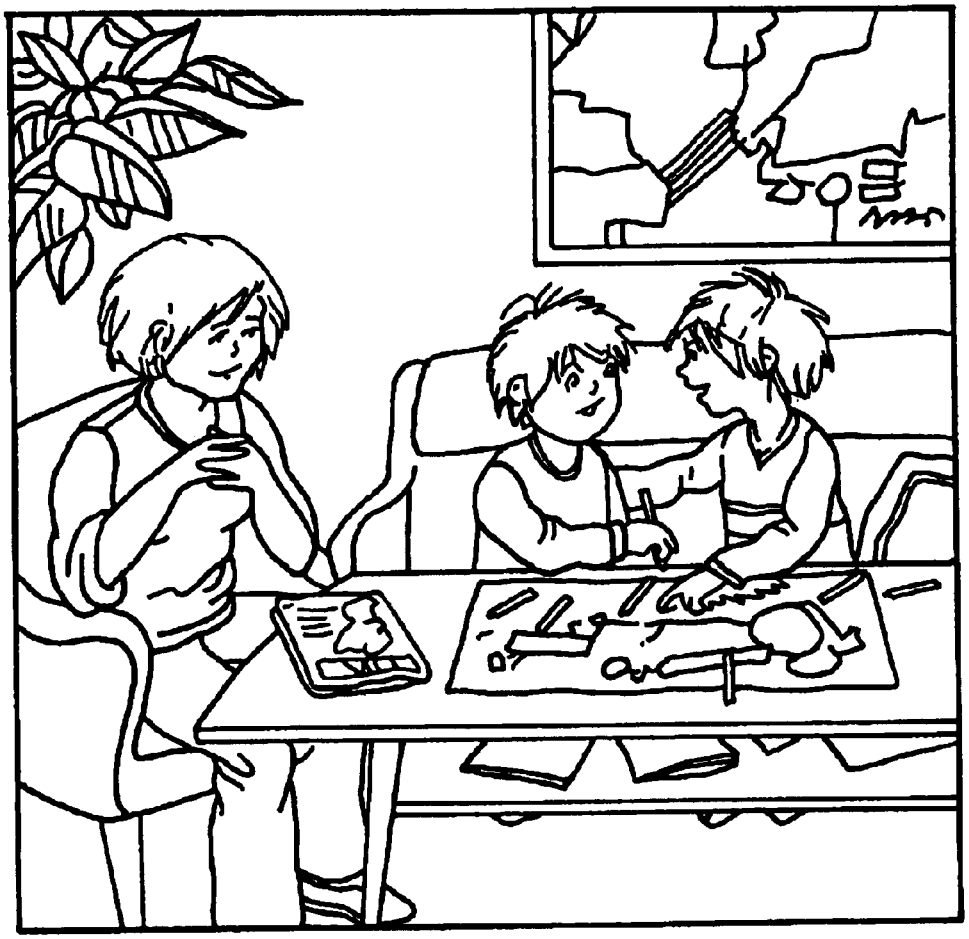

In FIG. 3, the mother also has her focus on her children, however, she is passively observing.

Figure 4:
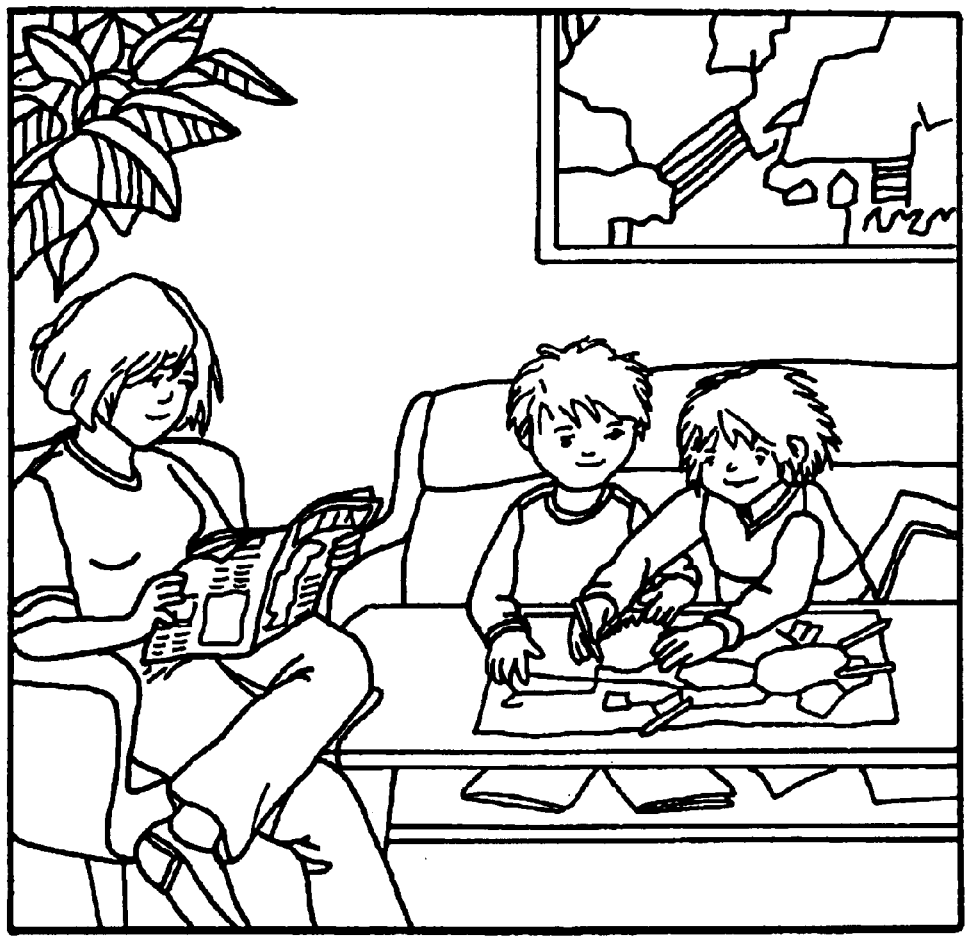

In FIG. 4, the mother concentrates on her reading. Her focus is on herself and she is passive.

Figure 5:
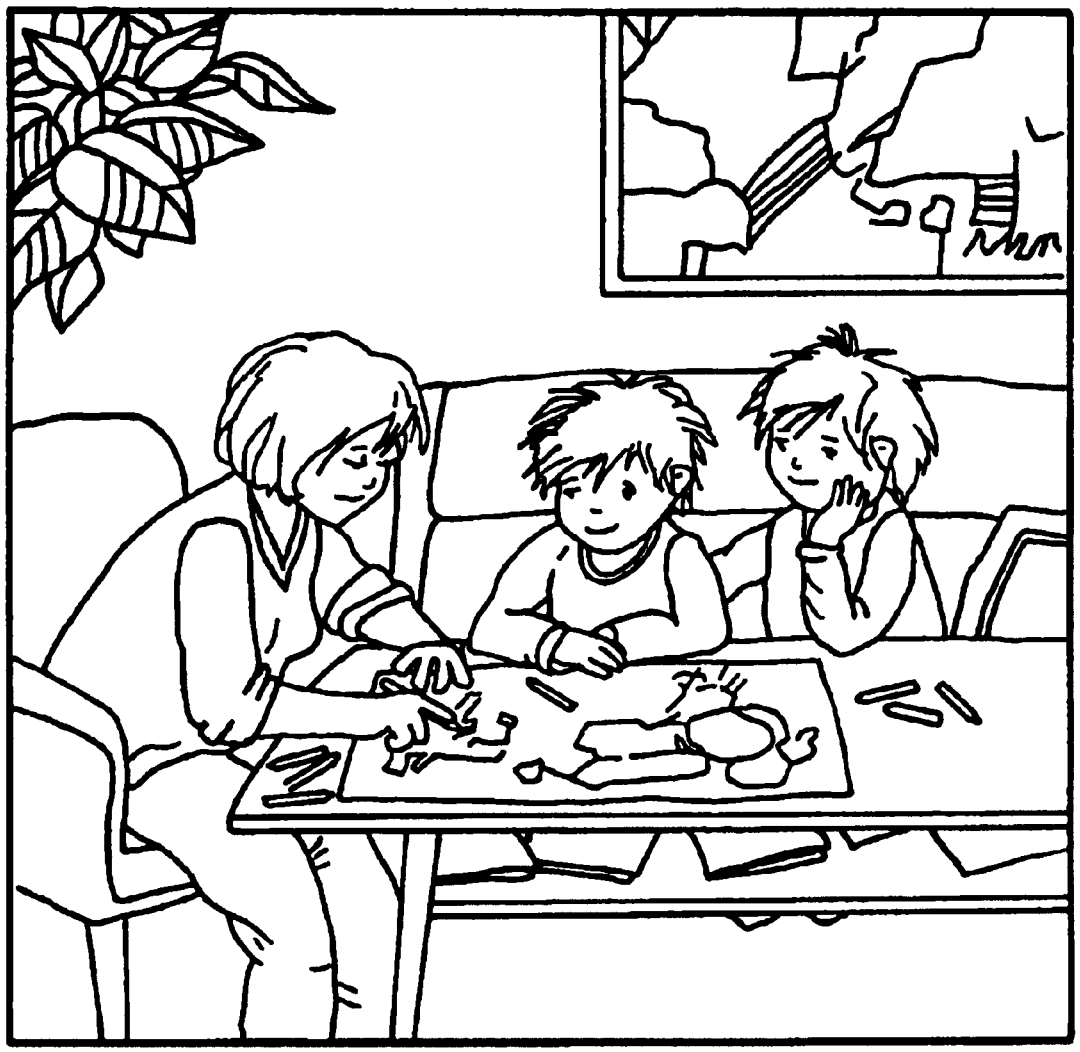

In FIG. 5, the mother is making a drawing while her children observe her activity. She is active and focused on herself.

Thus, FIGS. 2–5 are pictures illustrating the different combinations of the parent being passive or active and having focus on the child or focus on herself.

Figure 6:
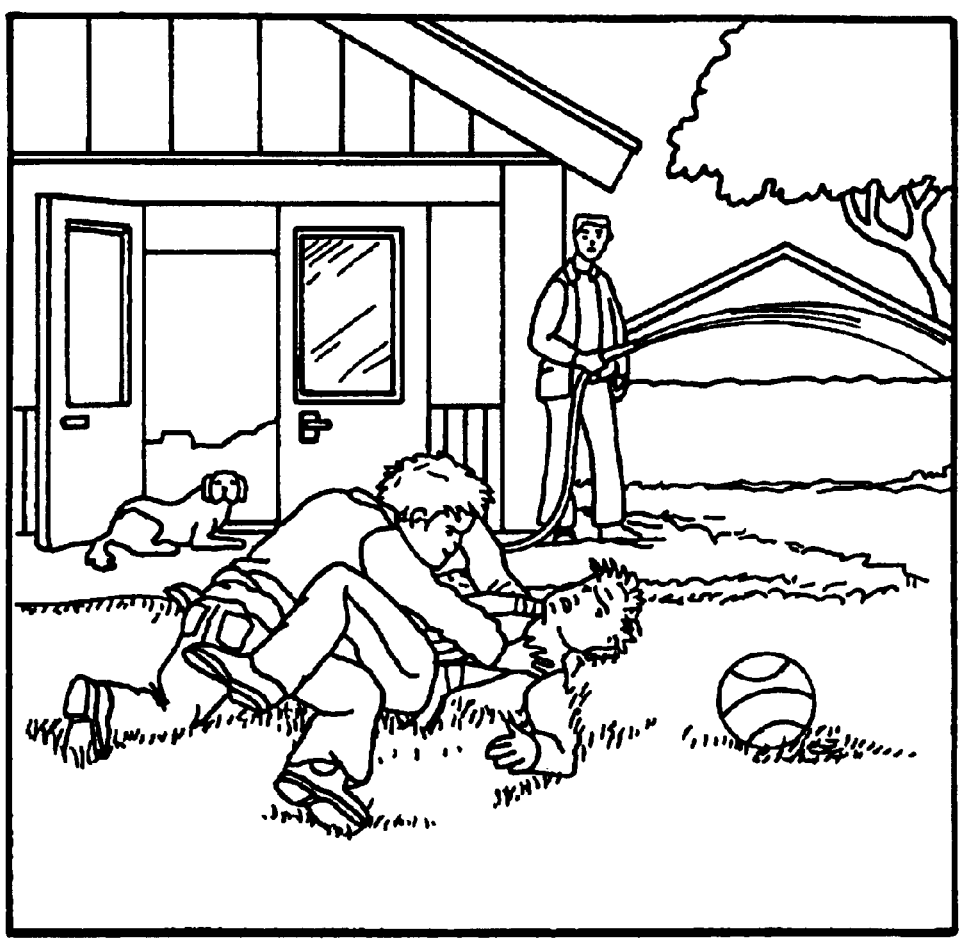
FIG. 6 shows a first picture relating to the parent's empathy toward the child.

FIG. 6 illustrates two boys having a fight in the garden. The father is nearby watching the boys.

Figure 7:
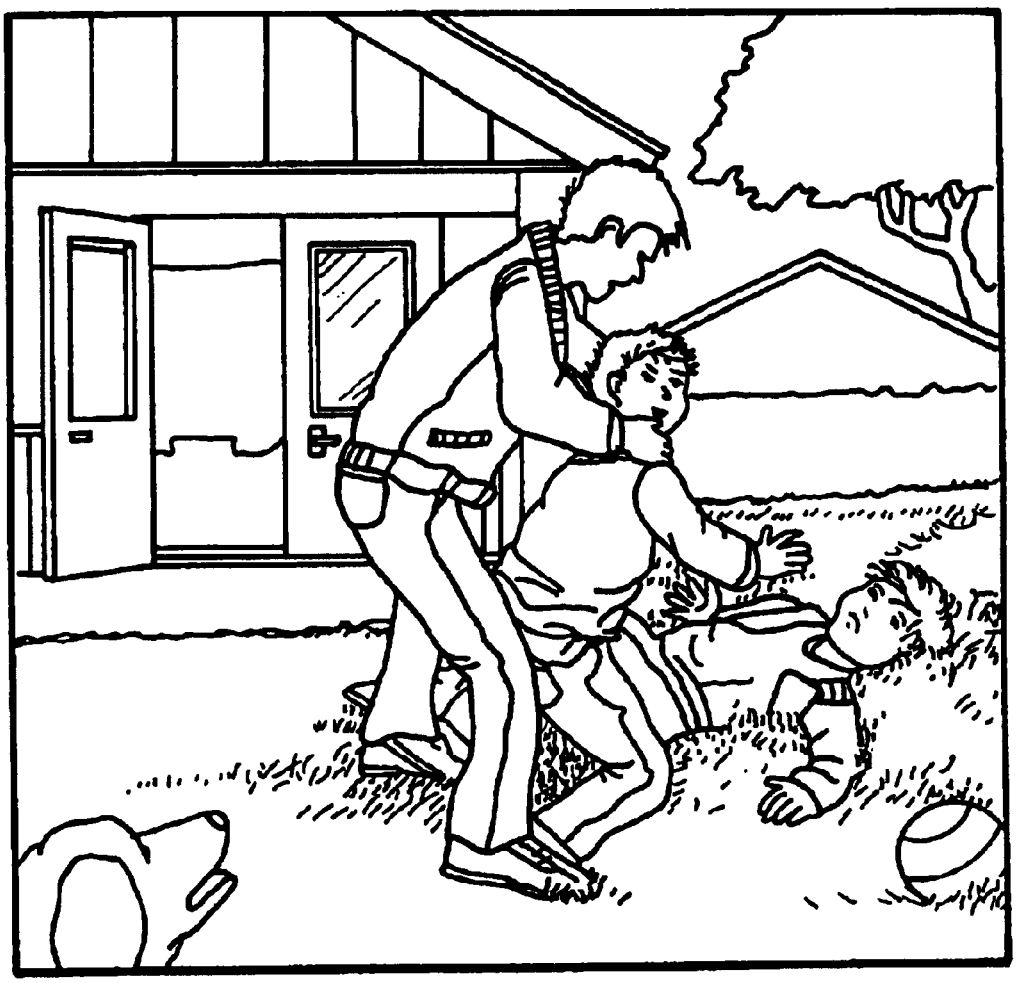
FIGS. 7–10 show a set of second pictures relating to the first picture of FIG. 6.

FIGS. 7–10 are pictures of possible succeeding situations where:

In FIG. 7, the father has gone to the boys and moves one of the boys away from the other one nagging about it. The father is active and intellectual in his interaction with the children.

Figure 8:
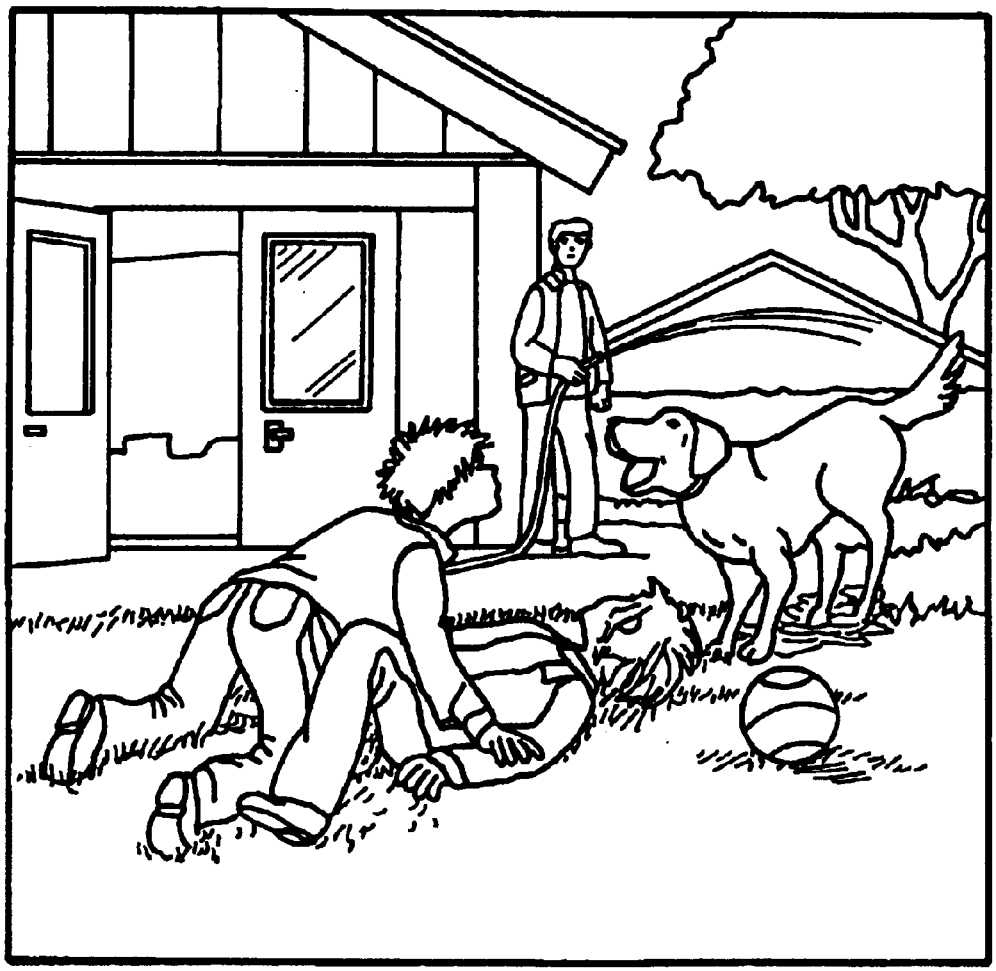

FIG. 8 shows the father staying at a distance from the boys telling them to stop fighting. The father is passive and intellectual in his interaction with the children.

Figure 9:
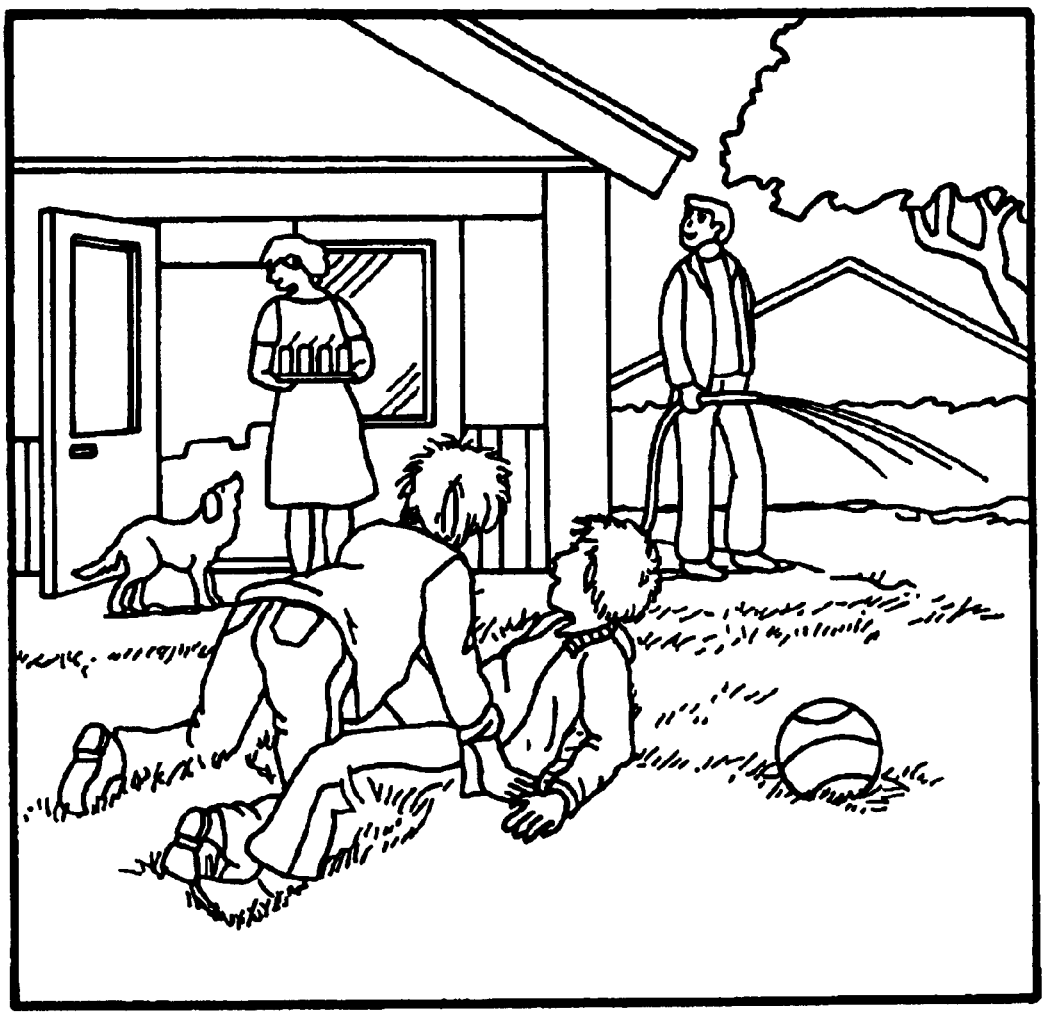

FIG. 9 shows the mother entering the garden with four glasses of lemonade on a tray. The parents are passive and emotional in their interaction with the children.

Figure 10:

FIG. 10 shows the father playing with the children. The father is active and emotional in his interaction with the children.

Thus, FIGS. 7–10 are pictures illustrating the different combinations of the parents being passive or active and being emotional or intellectual.

Figure 11:
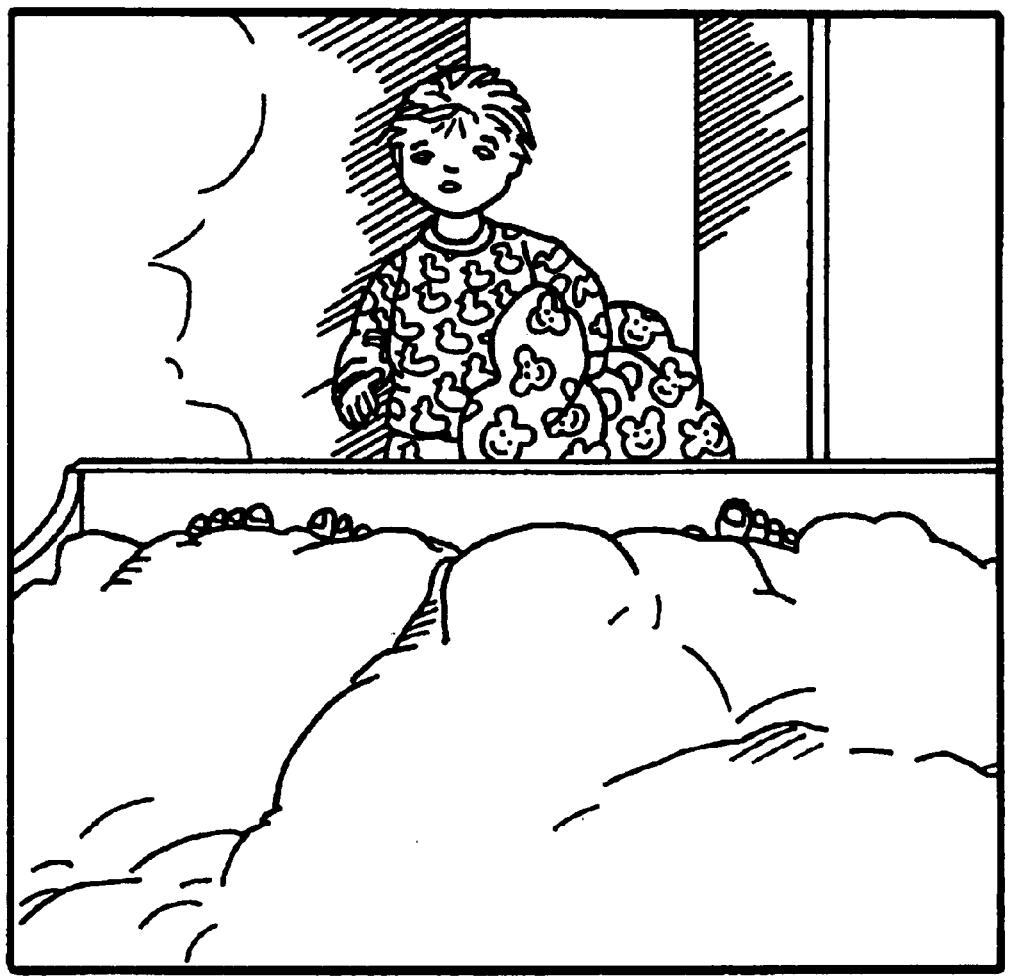
FIG. 11 shows a first picture relating to the parent's flexibility toward the child.

FIG. 11 is a presentation picture illustrating a child entering his parents' bedroom carrying his eiderdown.

Figure 12:
FIGS. 12–15 show a set of second pictures relating to the first picture of FIG. 11.

FIGS. 12–15 are pictures of possible succeeding situations where:

FIG. 12 illustrates a situation where the mother is sitting on the child's bed reading aloud to the child while the child is lying in his bed falling asleep. The mother is active and follows the rules for sleeping.

Figure 13:
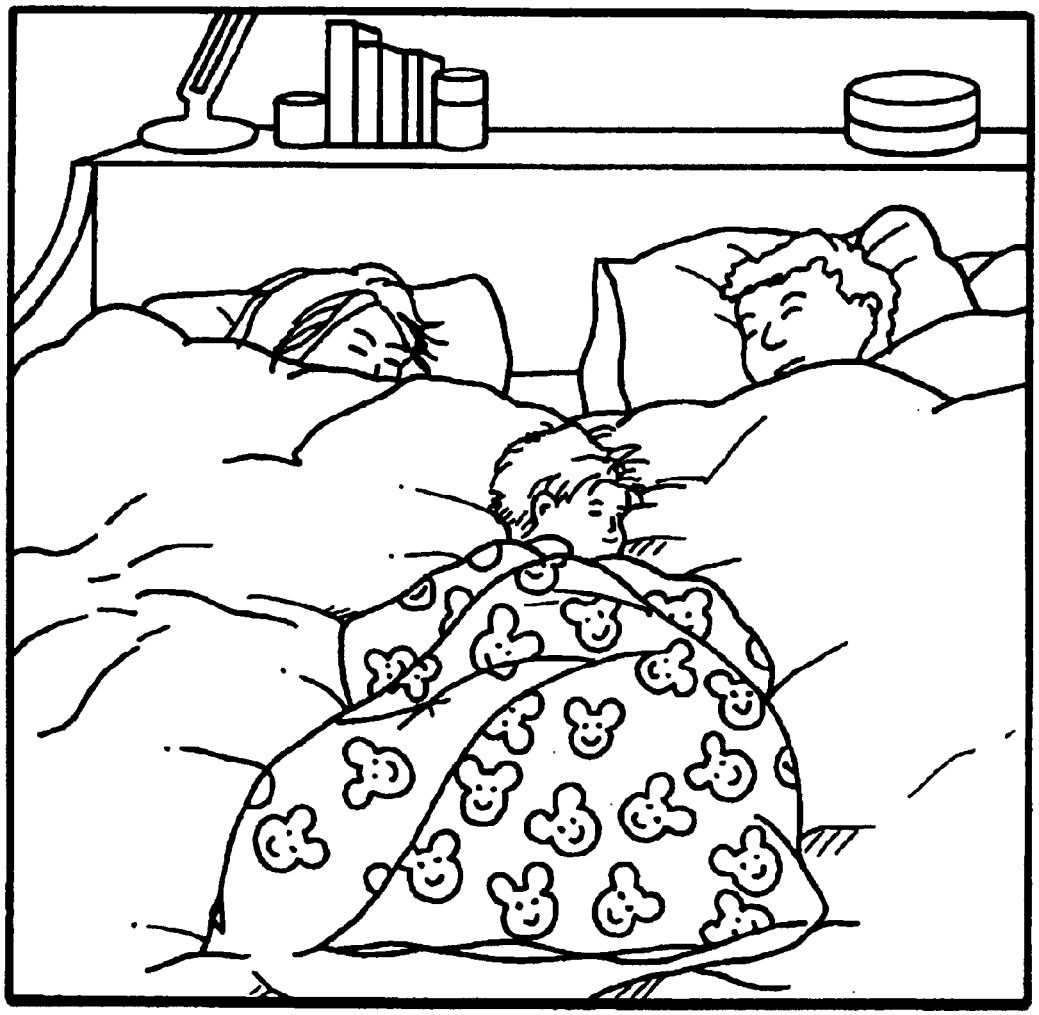

FIG. 13 illustrates a situation with the child lying between his parents in their bed at a distance from the parents. The parents are passive and follow the rules for sleeping.

Figure 14:
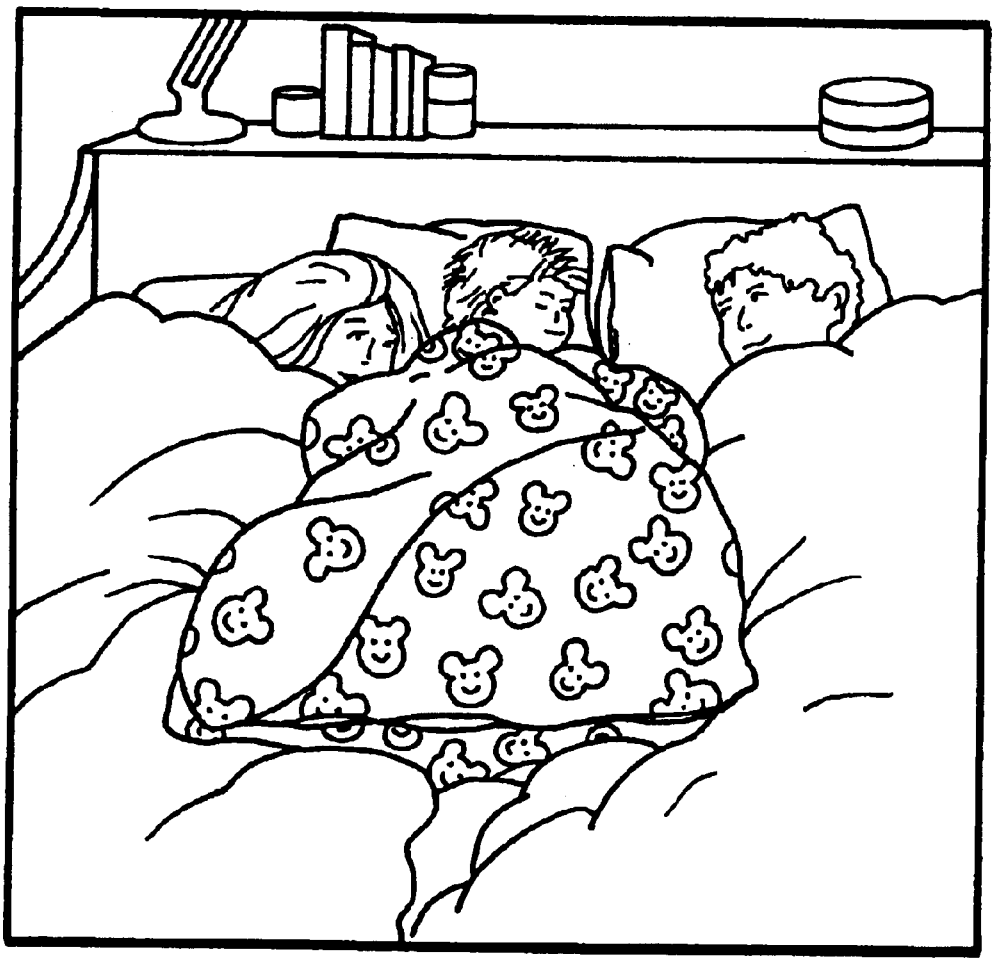

FIG. 14 illustrates a situation with the child also lying between his parents in their bed, however, lying close to his parents. The parents are passive and act on the basis of the actual situation.

Figure 15:
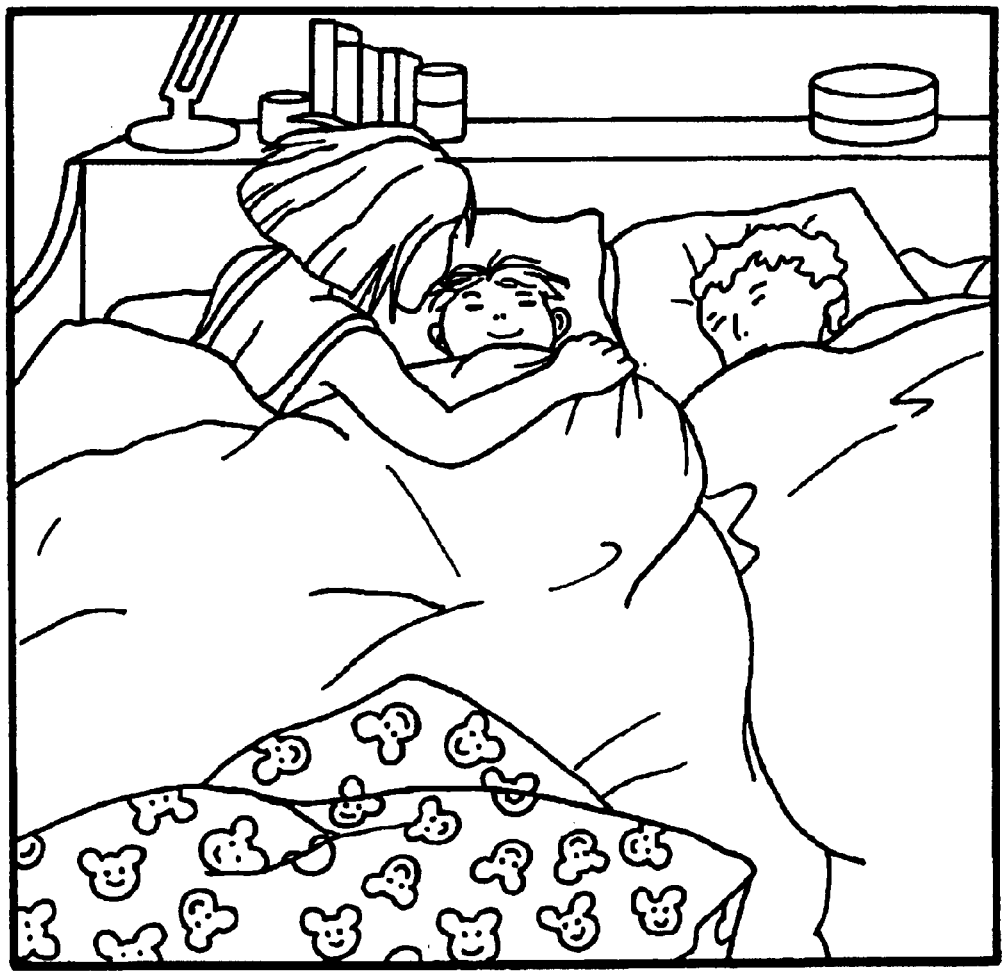

FIG. 15 illustrates a situation where the child is put to bed by his mother between his mother and father in their bed. The mother is active and she acts on the basis of the actual situation.

Thus, FIGS. 11–15 are pictures illustrating the different combinations of the parents being passive or active and following rules or acting on the basis of the actual situation.

Figure 16:
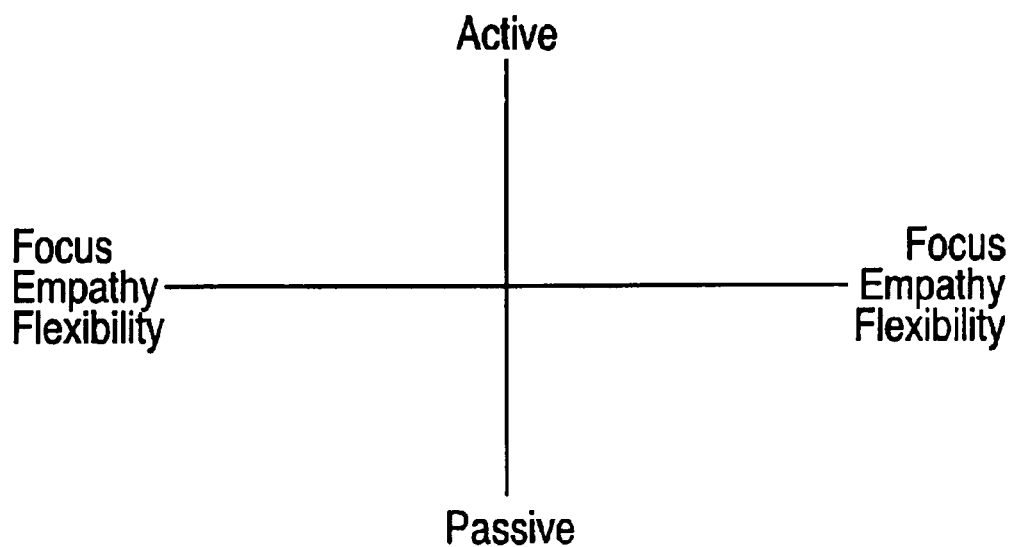
FIG. 16 illustrates the Dynamic Quadrants showing focus, empathy, or flexibility, respectively, in relation to energy.

FIG. 16 illustrates the Dynamic Quadrants showing focus, empathy, or flexibility, respectively, in relation to energy. Energy is quantified in two levels: active and passive. A person is said to be active in an interaction with other persons when the person is turned on by the surroundings, is energetic, present, committed, "on", noticeable and takes up "room" when being with others. The active person takes initiative, gets into dialogue, is in the field, acts out, sets the agenda and does something. The person may take decisions, may take action, hence showing persistence and perseverance.

A person is said to be passive in an interaction with other persons when the person is observing and noticing, shows a wait-and-see attitude. The passive person takes up less room, is less noticeable, hence giving room for others. The passive person is present and observing without taking leadership or interfering. The passive person is less acting out, is less "on", evading and is not in the field. The passive person takes no initiative, does not start a dialogue and sets no agenda, takes no decisions and is less conducting.

Figure 17:
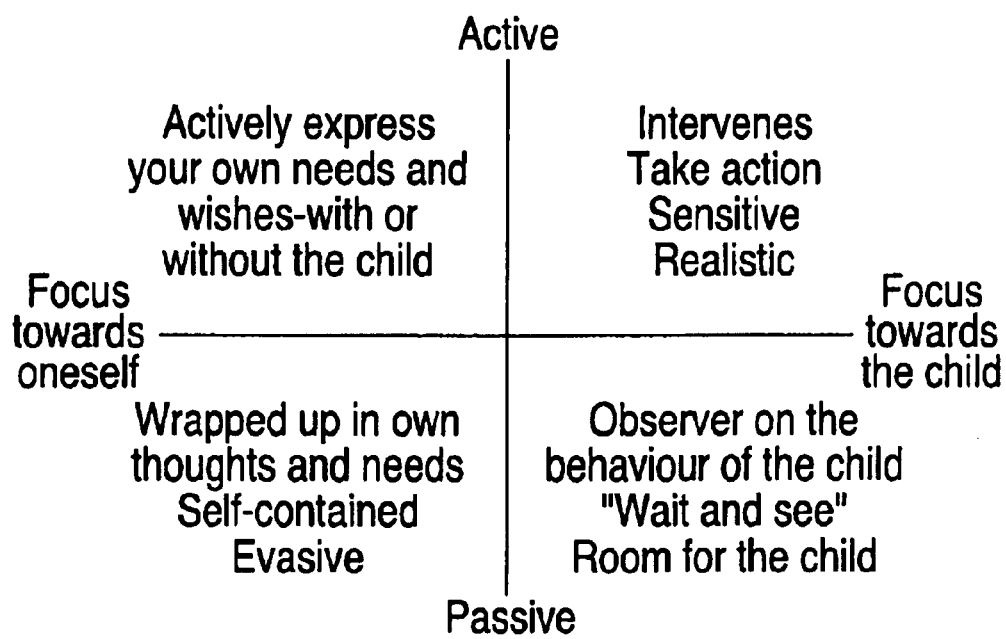
FIG. 17 illustrates the Dynamic Quadrant illustrating combinations of focus and energy.

FIG. 17 illustrates the Dynamic Quadrant illustrating combinations of focus and energy.

A parent is said to have focus towards the child when:

In perception he/she is sensitive and is turned on by signals from the child,

In attitude towards the child, the parent is prepared to be comprehensive, to understand and to read the needs, feelings and thoughts of the child, in combination with the situation and the child's acts. If the parent feels a need to educate the child, e.g. give directions to the child, it may primarily be out of the parent's perception of what may be in agreement with the nature of the child.

In behaviour/acting towards the child, the parent is prepared to be with the child, to get into dialogue and to get involved in the life of the child; i.e. the child's feelings, thoughts and activities, including doing something together with the child.

A parent is said to have focus towards himself or herself when:

In perception he/she is sensitive and is turned on by his or her own inner signals, needs, demands and business, In attitude towards the child, the parent is comfortable when the child demonstrates a wish to be on its own, or when the child attends to the parent's needs. The parent may easily decide to leave the child alone. If the parent feels a need to educate the child thus give directions to the child, it may primarily be out of the parent's own needs and ambitions.

In behaviour/acting towards the child, the parent is focusing on what may be the need of the parent, letting the child join into the situations, or the parent and the child may spend time together performing separate activities.

Figure 18:
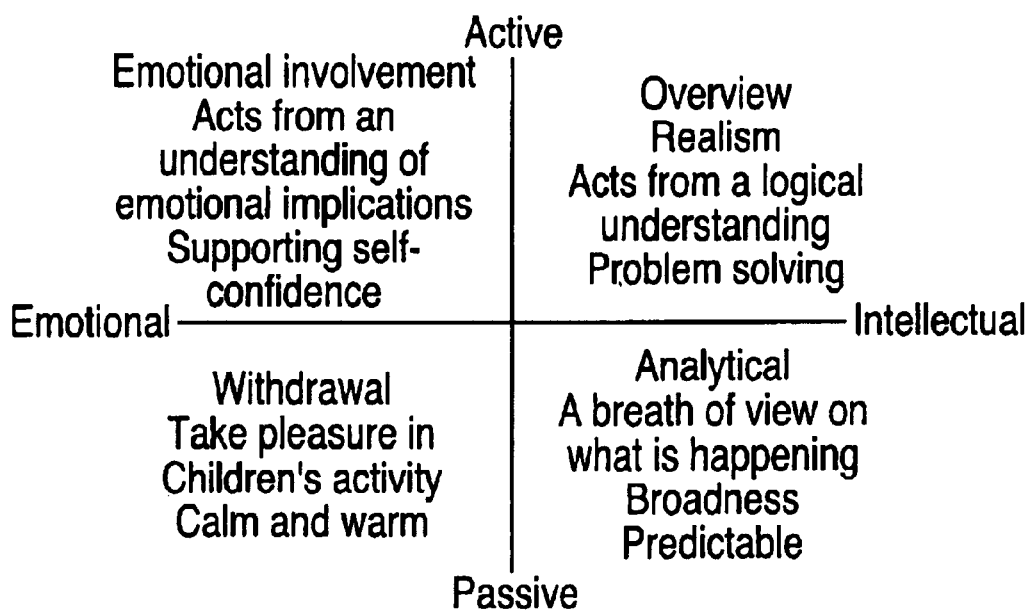
FIG. 18 illustrates the Dynamic Quadrant illustrating combinations of empathy and energy.

FIG. 18 illustrates the Dynamic Quadrant illustrating combinations of empathy and energy.

A parent is said to be intellectual in the interaction with a child when:

In perception the parent experiences and understands the child from how it appears and how the child functions in a logical context, In attitude towards the child, the parent is oriented towards conceiving, understanding and reading the needs of the child, it's feelings and thoughts in combination with the situation of the child and the rationale behind its behaviour.

The parent is prepared to try to read and understand the child based on a logical and analytical way of thinking and on the parent's experiences and knowledge in the field. Hence the parent is trying to uncover the needs of the child—presently and in the long term.

In behaviour/acting towards the child, the parent is prepared to uncover the problems and demands of the child—or what the child does express in the interaction—in a way, which prevents them from arising again, i.e. by making the child learning from the experience.

A parent is said to be emotional in the interaction with the child when: In perception the parent experiences and understands the child as it is and functions based on the parent's intuition and emotions, In attitude towards the child, the parent is oriented towards conceiving, understanding and reading the needs of the child, it's feelings and thoughts, as well as the situation of the child, including why the child acts as it does. The parent is prepared to try to read and understand the child, from primarily an emotional identification, including the parent's own experiences and knowledge in the field. Hence the parent is trying to uncover the needs of the child—presently and in the long term.

Figure 19:
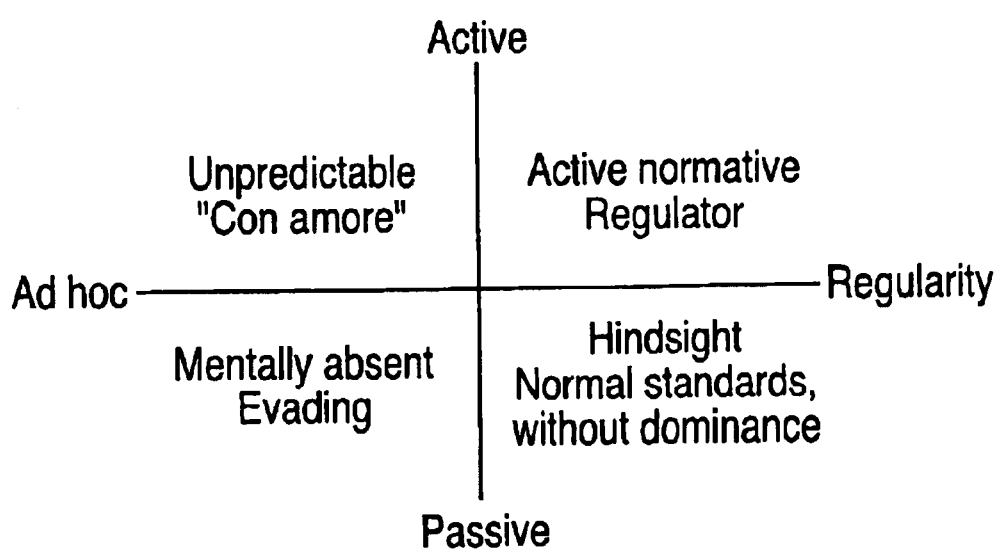
FIG. 19 illustrates the Dynamic Quadrant illustrating combinations of flexibility and energy, FIG. 20 illustrate the focus Dynamic Quadrant with corresponding second pictures, FIG. 21 illustrate the empathy Dynamic Quadrant with corresponding second pictures, FIG. 22 illustrate the flexibility Dynamic Quadrant with corresponding second pictures.

In behaviour/acting towards the child, the parent is prepared to uncover the problems and demands of the child—or what the child does express in the interaction—based on the parents' own intuition. The parent tries to oblige the problems in a way which makes the child secure and supports the child in it's own self-worth FIG. 19 illustrates the Dynamic Quadrant illustrating combinations of flexibility and energy.

Flexibility: the test shows whether the parent makes decisions on the basis of the actual situation, or whether the parent prefers to act according to an existing set of rules and principles.

A parent is said to prefer to act according to an existing set of rules and principles when:

In perception the parent primarily experiences the child based on pre-determined values, norms and experiences, In attitude towards the child, the parent expects the child to behave as usual and as is expected from a child on its age, in its situation, family etc.

In behaviour/acting towards the child, the parent underlines the existence of rules and regulations—usually by the force of example—what is right and what is wrong.

The parent makes decisions on the basis of the actual situation when:

In perception the parent primarily experiences the child in the actual context, the needs and the possibilities of the situation, In attitude towards the child, the parent expects the child to join in the game, based on the given conditions, the needs and the possibilities, In behaviour/acting towards the child, the parent underlines the need for "reading" the situation and how to make use of the possibilities, in a given situation.

Figure 20:
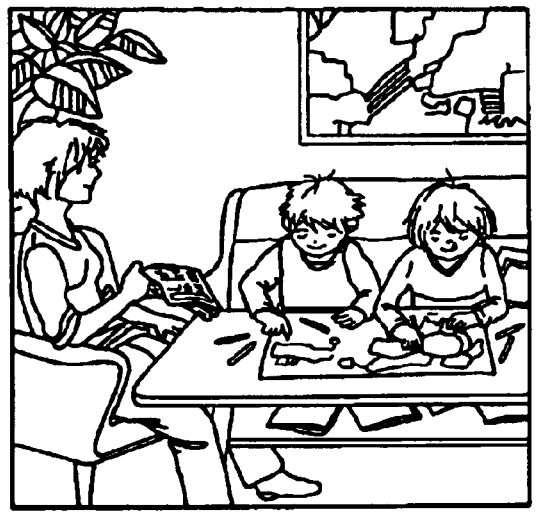
Figure 20:
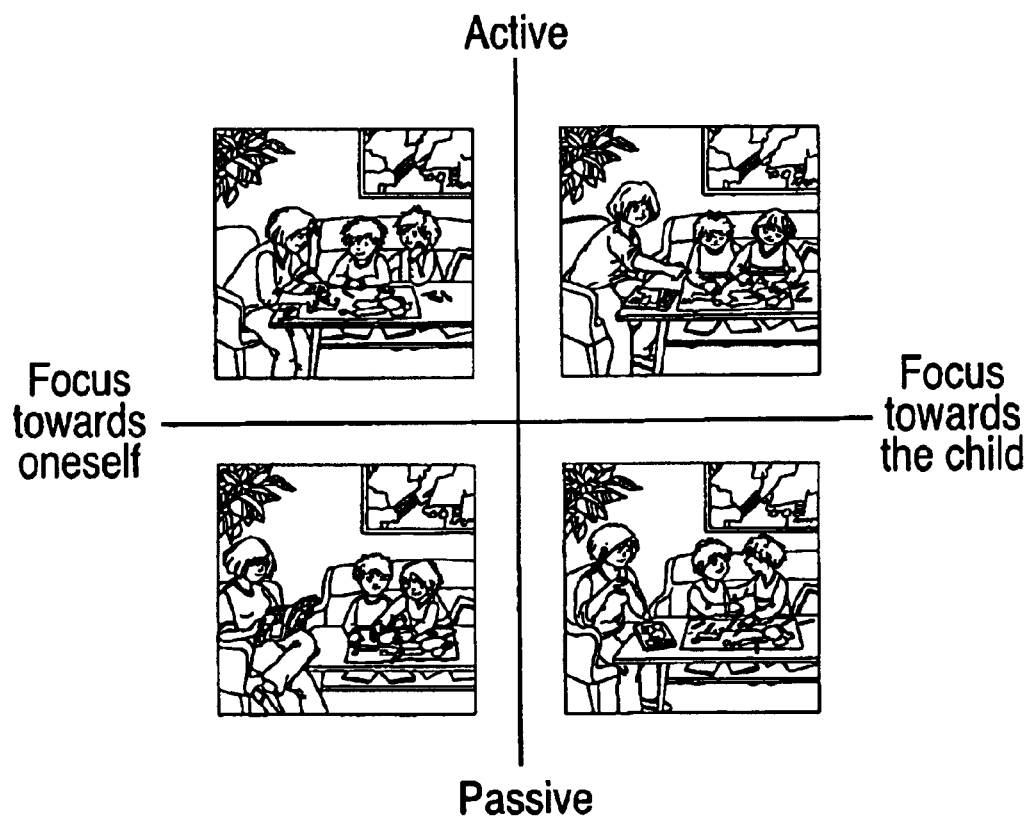
Figure 21:
Figure 21:
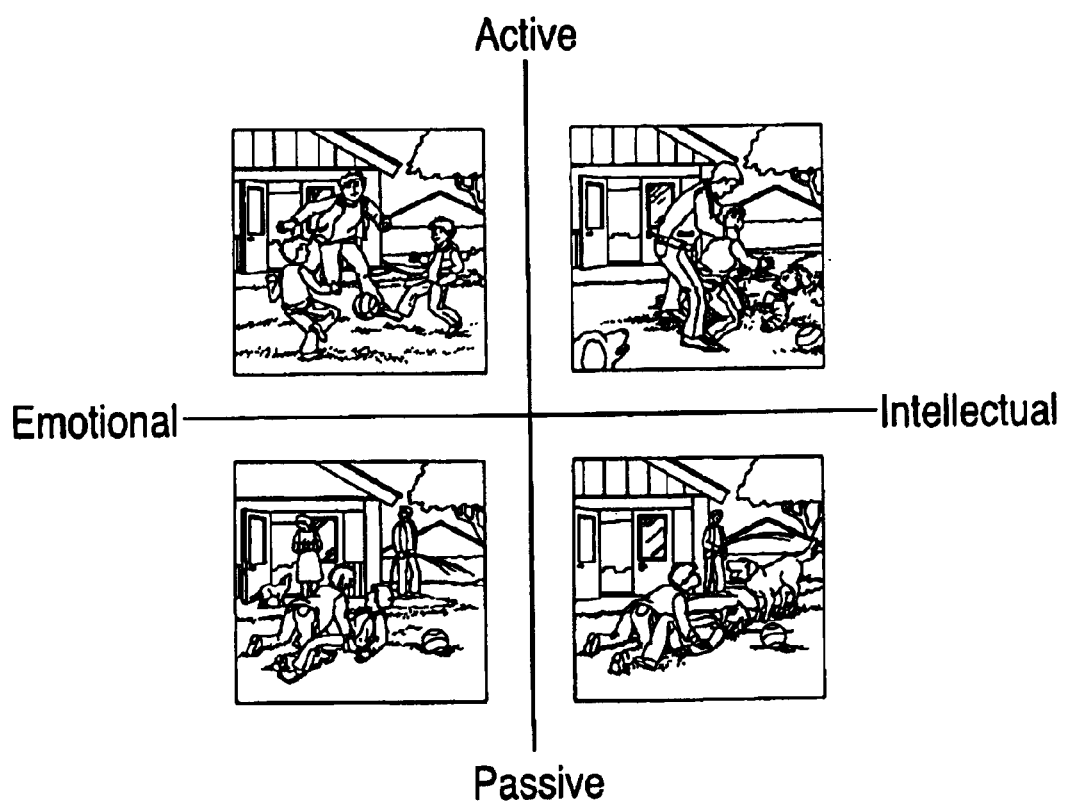
Figure 22:
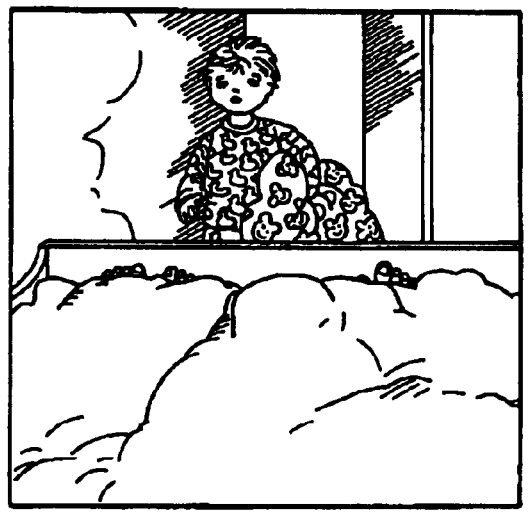
Figure 22:
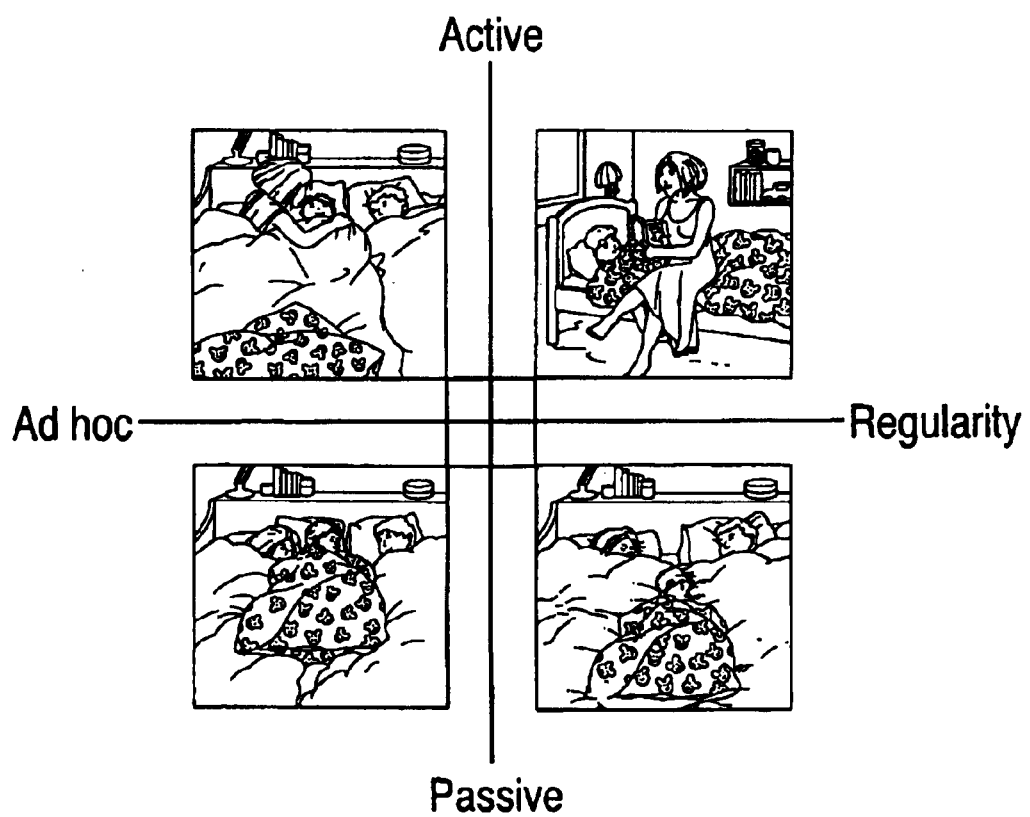

In FIGS. 20–22, the sets of pictures shown in FIGS. 1–15 are shown in relation to the respective Dynamic Quadrants.

Figure 23:
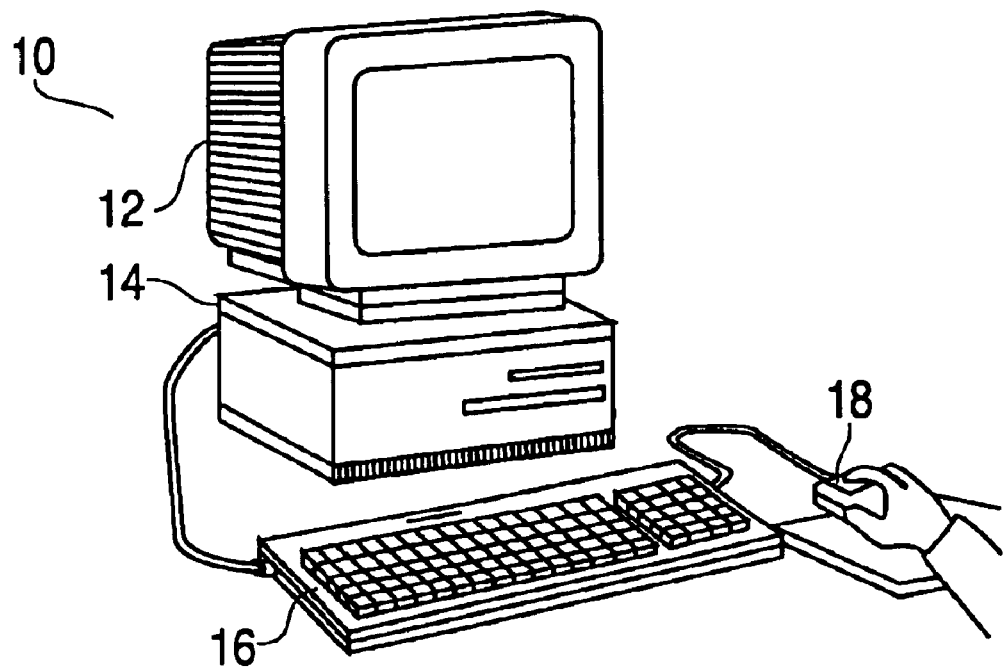
FIG. 23 is a perspective view of a computer implementation of the invention.

FIG. 23 is a perspective view of a computer implementation of the invention. The embodiment includes a personal computer 10 with a processor 14 having an internal hard disc, CD-ROM drive, an audio capability, a display 12, a keyboard 16, and a pointing device, such as a mouse 18. The display 12 may be a touch sensitive display screen. It will be appreciated by those skilled in the art that the actual hardware implementation of the system is a matter of choice. Thus, the system may be distributed across a network from a server, or may be provided by an on-line service for example over the Internet. For example, the computer may be a portable computer that can be connected to the Internet via a mobile phone, or the user may be connected to the Internet via a broadband connection, e.g. utilising the user's TV.

Figure 24:
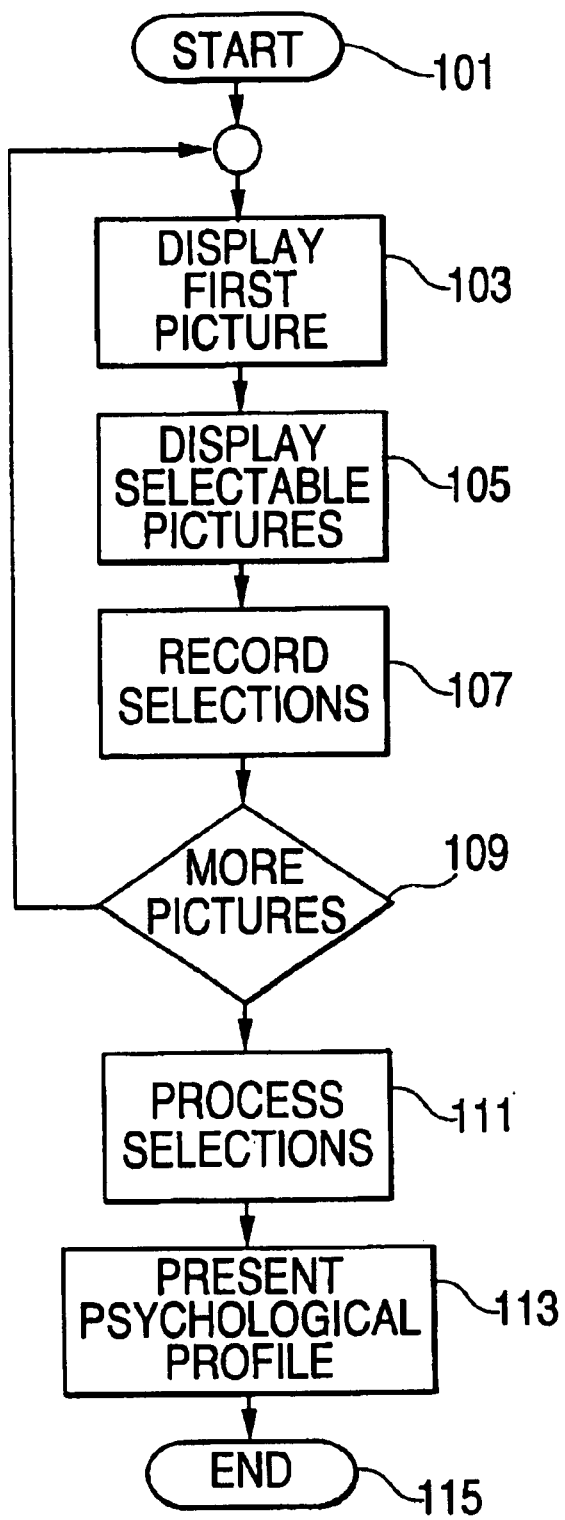
FIG. 24 shows a flowchart of a computer implemented test method according to the present invention.

FIG. 24 shows a flowchart of a computer implemented test method according to the present invention. In step 101 the method is initialised and the computer is set up to begin a new test of a test person. Preferably the test is conducted under supervision of a psychologist. The psychologist logs on to the appropriate home page on the Internet with his or her personal secret access code. In step 103, the person under test is presented with a first picture illustrating a specific situation as described above. The person under test is asked to explain in words how he or she perceives the situation illustrated by the picture. When the person under test has understood what is going on in the picture, he or she clicks the mouse and the four selectable second pictures are displayed in step 105. The person under test may select one of the second pictures for magnification in such a way that the magnified picture occupies a significant part of the display screen maintaining an indication of or a connection to the other second pictures. When the person under test has decided which second picture to select, the selection is signalled to the computer by moving the cursor with the mouse to be within the frame of the picture to be selected and clicking the mouse in step 107. If the display screen is a touch sensitive screen, the person under test simply indicate the selection by touching the selected picture. The selection is recorded and stored for later retrieval and processing by the computer. In step 109, it is determined whether there are more pictures to present to the person under test. If so, the process continues at step 10. The first items shown to the person under test are training items that are used to familiarize the person with the test.

When there are no more pictures to present to the person under test, the selections are processed in step 111 for provision of a psychological profile of the test object. For example, the psychologist supervising the test may log on to the system with a specific access code providing access to the processing of the selections. The selections may be combined with demographic data entered into the system by the psychologist based on answers of the person under test to questions asked by the psychologist. Name and other personal data of the person under test are preferably encrypted so that these data are revealed only upon log on with the appropriate access code. The profile is output in step 113. After presentation of the output, the method ends in step 115, the demographic data and the selections are combined and a report is generated. The report has a text part and a graphical part. For a parent, a parent profile may be generated based on the selections made by the parent under test alone or in combination with selections from a test performed by the spouse and/or selections from one or more tests performed by the parent's respective children. Based on a comparison of the generated profile with predefined general parent profiles, the person under test is presented with a description of him or her as a parent by the psychologist.

The report may be displayed on the computer display, e.g. a touch sensitive screen, and by touching specific parts of the report, the corresponding parts may be further elaborated upon in a further description displayed on the screen, e.g. a picture, a video sequence, an audio sequence, or a combination hereof, may further illustrate a development of a given situation that may be experienced by the parent, e.g. illustrating an expected pattern of reactions of the parent in similar situations. Thus, a visual illustration may be used to make statements in the report more clear to the person in question. The report may be stored in the test database, preferably in a part of the database that requires an access code for provision of access.

The system may further provide suggestions or recommendations for improvement of interactions in the family in question. For example, a video sequence which functions similar to a video game may be provided for illustration of certain situations that a family typically experiences and that incorporates the test results of persons of the family and the corresponding profiles. One or more or all family members may use the video sequence alone or together with the psychologist. The video sequence illustrates a certain situation and the test object selects a specific reaction to the situation and the video sequence illustrates how the situation develops in response to the selected reaction. The video sequence may end with an evaluation of the selections made by the test object and may further provide suggestions for more desirable reactions to the illustrated situations thereby facilitating improvement of the test objects way of interacting with the other members of the family.

Over time, the test object may be presented with various video sequences of the above-mentioned type relating to specific different aspects of the report of the test object and further illustrating any development in the test object's abilities as a parent. The development of the test object may be recorded in the database.

All test data, i.e. selections made by persons under test and suggestions for counselling to the persons under test and further development during follow-up, are stored anonymously in a central database for further development of the test and monitoring of the quality of the items and pictures of the test. For example, if a certain picture is never selected, a revision of the corresponding item is probably required. Further, the database may form the basis for measurement of the general effect of the test and of the video sequences used for further counselling of test persons facilitating further developments of the test and video sequences.

In an Internet based system, distribution of physical material, e.g. manuals, programmes, etc, is minimized. Further, the test may easily be adapted to different geographical areas and cultures since the person under test may indicate his or her geographical position and the displayed pictures or video sequences may relate to the indication by displaying persons belonging to the indicated area (e.g. clothing, color, etc.).

The video sequences may be displayed in a virtual reality system further improving the realism of the illustrated situations, for example the parents and children may be displayed in the virtual reality video.

What is claimed is:

1. A computer implemented picture based psychological test method for provision of an output characterizing a person, comprising the steps of:

providing a first picture of a first situation, providing a set of second pictures of respective second situations, selecting by the test person of a second picture from among the set of second pictures that is perceived by the test person to have the most obvious relation to the first picture, wherein a plurality of first pictures with respective sets of second pictures relates to a same specific combination of two parameters, and processing the selection for provision of an output characterizing the person.

2. A method according to claim 1, wherein the output is a profile of the person.

3. A method according to claim 2, wherein the profile comprises at least two parameters.

4. A method according to claim 3, wherein the profile comprises a set of diagrams that each has one parameter depicted along an x-axis and another parameter along a y-axis.

5. A method according to claim 4, wherein energy is depicted along the y-axis.

6. A method according to claim 4, wherein focus is depicted along the x-axis.

7. A method according to claim 4, wherein empathy is depicted along the x-axis.

8. A method according to claim 4, wherein flexibility is depicted along the x-axis.

9. A method according to claim 1, wherein eight first pictures relate to the same specific combination of two parameters.

10. A method according to claim 1, wherein a first picture and each of the second pictures form a respective sequence of pictures corresponding to a respective sequence of situations wherein a situation of the second picture precedes or succeeds a situation of the first pictures and wherein the person is asked to select the second picture from the sequence of pictures that belongs to the sequence of situations that the person finds most likely to occur.

11. A method according to claim 1, wherein a set of second pictures consists of four pictures.

12. A method according to claim 1, further comprising the step of displaying the first and second pictures on an electronic display unit.

13. A method according to claim 1, wherein the step of selecting is performed using an electronic selector.

14. A method according claim 1, further comprising the step of storing the output in a database.

15. A method according to claim 1, wherein the output is a general description relating to the resources and the development possibilities of the person.

16. An electronic system for automation of a picture based psychological test, comprising a processor that is adapted to provide an output characterizing a person based on the psychological test, comprising the steps of:

providing a first picture of a first situation, providing a set of second pictures of respective second situations, selecting by the test person of a second picture from among the set of second pictures that is perceived by the test person to have the most obvious relation to the first picture, wherein the plurality of first pictures with respective sets of second pictures relates to a same specific combination of two parameters, and communicating the selection to the processor, and wherein the processor processes the selection for provision of the output characterizing the person.

17. An electronic system according to claim 16, wherein the output is a profile of the person.

18. An electronic system according to claim 17, wherein the profile comprises at least two parameters.

19. An electronic system according to claim 17, wherein the profile comprises a set of diagrams that each has one parameter depicted along an x-axis and another parameter along a y-axis.

20. An electronic system according to claim 19, wherein energy is depicted along the y-axis.

21. An electronic system according to claim 19, wherein focus is depicted along the x-axis.

22. An electronic system according to claim 19 wherein empathy is depicted along the x-axis.

23. An electronic system according to claim 19, wherein flexibility is depicted along the x-axis.

24. An electronic system according to claim 16, wherein eight first pictures relate to the same specific combination of two parameters.

25. An electronic system according to claim 16, wherein a first picture and each of the second pictures form a respective sequence of pictures corresponding to a respective sequence of situations wherein a situation of the second picture precedes or succeeds a situation of the first picture, and wherein the person is asked to select the second picture from the sequence of pictures that belongs to the sequence of situations that the person finds most likely to occur.

26. An electronic system according to claim 16, further comprising a display for display of the first and second pictures, and selection means for selection of one of the second pictures.

27. An electronic system according to claim 26, wherein the display and the processor are interconnected via a computer network.

28. An electronic system according to claim 27, wherein the Internet forms part of the computer network.

29. A database for storage of output provided by a system according to claim 16.

* * * * *